US008522608B2

(12) United States Patent
Odendall

(10) Patent No.: US 8,522,608 B2
(45) Date of Patent: Sep. 3, 2013

(54) METHOD FOR DETERMINING THE OXYGEN STORAGE CAPACITY OF A CATALYTIC CONVERTER

(75) Inventor: Bodo Odendall, Lenting (DE)

(73) Assignee: Audi AG, Ingolstadt (DE)

( * ) Notice: Subject to any disclaimer, the term of this patent is extended or adjusted under 35 U.S.C. 154(b) by 204 days.

(21) Appl. No.: 13/193,054

(22) Filed: Jul. 28, 2011

(65) Prior Publication Data

US 2012/0031178 A1 Feb. 9, 2012

(30) Foreign Application Priority Data

Aug. 7, 2010 (DE) ......................... 10 2010 033 713

(51) Int. Cl.
*G01M 15/10* (2006.01)

(52) U.S. Cl.
USPC ........................................................ 73/114.75

(58) Field of Classification Search
USPC ............... 73/114.69, 114.71, 114.72, 114.73, 73/114.75
See application file for complete search history.

(56) References Cited

U.S. PATENT DOCUMENTS

| | | | | |
|---|---|---|---|---|
| 7,926,333 | B2 * | 4/2011 | Odendall | 73/114.75 |
| 8,225,649 | B2 * | 7/2012 | Odendall et al. | 73/114.75 |
| 2002/0157379 | A1 | 10/2002 | Kakuyama et al. | |
| 2009/0235726 | A1 * | 9/2009 | Odendall | 73/114.75 |
| 2011/0056269 | A1 * | 3/2011 | Odendall et al. | 73/23.2 |

FOREIGN PATENT DOCUMENTS

| | | |
|---|---|---|
| DE | 601 26 022 T2 | 6/2007 |

* cited by examiner

*Primary Examiner* — Eric S McCall
(74) *Attorney, Agent, or Firm* — Henry M. Feiereisen LLC

(57) ABSTRACT

An offset in the signal of a pre-catalytic converter lambda probe of an exhaust gas system of an internal combustion engine affects a measured oxygen intake storage capacity and a measured oxygen removal storage capacity of an oxygen store with identical magnitude, but with opposite mathematical sign, so that their sum is independent of the offset. The oxygen intake storage capacity and the oxygen removal storage capacity are hereby determined until the output signal of the post-catalytic converter probe exceeds an intermediate threshold value of, for example, 0.45 V for intake and 0.8 V for removal. Exposure of the oxygen store to rich and/or lean exhaust gas is maintained after this threshold value has been crossed to ensure that the oxygen store is indeed sufficiently filled after the oxygen intake storage capacity has been measured, or is sufficiently emptied after the oxygen removal storage capacity has been measured.

3 Claims, 4 Drawing Sheets

METHOD FOR DETERMINING THE OXYGEN STORAGE CAPACITY OF A CATALYTIC CONVERTER

CROSS-REFERENCES TO RELATED APPLICATIONS

This application claims the priority of German Patent Application, Serial No. 10 2010 033 713.7, filed Aug. 7, 2010, pursuant to 35 U.S.C. 119(a)-(d), the content of which is incorporated herein by reference in its entirety as if fully set forth herein.

BACKGROUND OF THE INVENTION

The present invention relates to a method for determining the oxygen storage capacity of an oxygen store associated with a catalytic converter in the exhaust gas system for an internal combustion engine.

The following discussion of related art is provided to assist the reader in understanding the advantages of the invention, and is not to be construed as an admission that this related art is prior art to this invention.

Conventional exhaust gas system include in the flow direction of the exhaust gas a pre-catalytic converter lambda probe arranged in the exhaust gas system upstream of at least a section of the catalytic converter, and a post-catalytic converter lambda probe arranged downstream of the section of the catalytic converter.

The oxygen storage capacity can be determined by initially completely removing oxygen from the oxygen store, thereafter exposing the oxygen store to lean exhaust gas, and integrating the quantity of oxygen introduced per unit time during the exposure with lean exhaust gas based on the air-fuel ratio. The integral is typically determined starting from the onset of the exposure with lean exhaust gas for the purpose of introducing oxygen and ending when the signal from the post-catalytic converter lambda probe crosses a threshold value. When the signal crosses the threshold value, a changeover to exposure with rich exhaust gas is initiated.

The air-fuel ratio in the exhaust gas to which the catalytic converter is exposed is determined based on the output signals of the pre-catalytic converter lambda probe.

However, an offset in the output signal of the pre-catalytic converter lambda probe can have harmful effects: if the lambda probe shows a higher output voltage or a lower output voltage than would otherwise be obtained for the actual air-fuel ratio when using a correctly functioning lambda probe, then the measured oxygen storage capacity is either too high or too low.

It would therefore be desirable and advantageous to obviate prior art shortcomings and to provide an improved method for correctly determining the oxygen storage capacity of the catalytic converter even in the presence of such offset in the output signal of a lambda probe.

SUMMARY OF THE INVENTION

According to one aspect of the present invention, a method for determining oxygen storage capacity of an oxygen store associated with a catalytic converter in an exhaust gas system of an internal combustion engine, with the exhaust gas system having a pre-catalytic converter lambda probe arranged upstream of at least one section of the catalytic converter and a post-catalytic converter lambda probe arranged downstream of the at least one section in the flow direction of exhaust gas, includes the steps of:

a) removing oxygen from the oxygen store to produce a substantially empty oxygen store or introducing oxygen in the oxygen store to produce a substantially full oxygen store, b) exposing the substantially empty oxygen store to lean exhaust gas or exposing the substantially full oxygen store to rich exhaust gas, until an output signal of the post-catalytic converter lambda probe satisfies a first predetermined criterion which is selected so that the oxygen store is completely full or completely empty in relation to a predetermined level, even if an output signal of the pre-catalytic converter lambda probe has an offset, and determining a first time integral over the introduced or removed quantity of oxygen per unit time from the time of the exposing until a first threshold value is crossed, c) further exposing the oxygen store that was previously exposed in step b) to lean exhaust gas to rich exhaust gas or exposing the oxygen store that was previously exposed in step b) to rich exhaust gas to lean exhaust gas, and determining a second time integral over the removed or introduced quantity of oxygen per unit time starting from the time of the further exposing until a second threshold value is crossed, and d) adding absolute values of the first time integral and the second time integral to obtain a measure for the oxygen storage capacity.

The method for determining the oxygen storage capacity differs from conventional methods for determining the oxygen storage capacity in that, although the integrals are in each case determined until a threshold value is crossed, crossing the threshold value itself does not cause the exposure with lean or rich exhaust gas to change over. In particular, the predetermined criterion generally takes into account that although the threshold value that otherwise triggers the changeover in the exposure has already been reached, the same exposure is still maintained. Accordingly, the exposure to lean or rich exhaust gas is extended at the first time and preferably both times so as to ensure that the oxygen store is in fact filled or emptied.

If this condition is satisfied, then the offset in the output signal of the lambda probe causes—up to a certain degree—that the first time integral is smaller or greater by exactly the same amount as the second time integral is greater or smaller. The effects of the offset compensate each other when the two integrals are added. If the offset does not exceed a certain amount, then the oxygen storage capacity can be correctly computed with certainty. (For a precise determination of the oxygen storage capacity, the sum of the two integrals can be divided by two).

The inventor of the presently claimed method has recognized that this compensation can be accomplished through addition of the two time integrals, when the complete filling and emptying of the oxygen store is by and large ensured.

The first and/or second predetermined criterion may particularly include that the output signal of the lambda probe crosses an additional, i.e., third or fourth, threshold value, wherein the third or fourth threshold value are hereby defined so as to be crossed after the first and/or after the second threshold value. After the third and/or fourth threshold value has been crossed, it can be checked if the value of the output signal (i.e., the output voltage) of the lambda probe or its time derivative has reached a limit value (i.e., a fifth or sixth threshold value).

This approach is based on the realization that the output signal from the lambda probe saturates when the oxygen store is completely filled or emptied, so that it can be checked if the output signal exceeds a threshold value close to the maximum or minimum before a maximum or minimum is reached, and that a criterion for reaching the maximum or minimum can the be used which relates to exactly this maximum or minimum or to the time derivative in the region of the maximum or minimum.

If the third and/or fourth threshold value and the limit value are suitably selected, then the method will not only ensure that the surface store of the catalytic converter is emptied or filled, which causes a jump in the output signal of the lambda probe, but also that the deep store of the catalytic converter is in fact emptied or completely filled.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
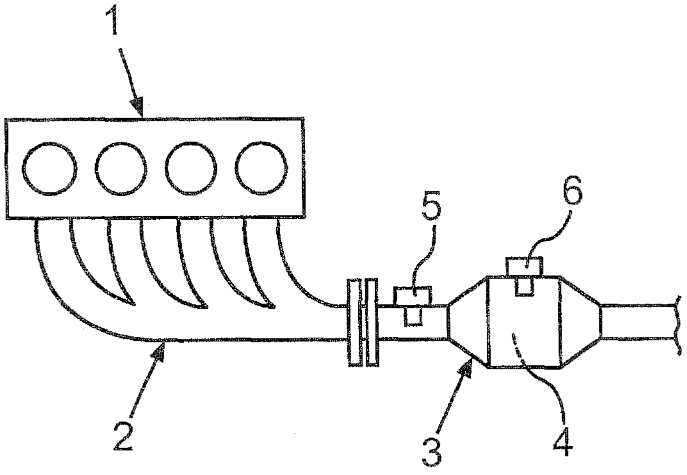
FIG. 1 shows an arrangement configured for carrying out the method according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of an internal combustion engine 1 with an exhaust gas system 2. The exhaust gas system 2 includes an exhaust gas catalytic converter 3, which is constructed, for example, as a three-way catalytic converter, as a NOx storage catalytic converter, or as an active particle filter, as well as an integrated oxygen store 4. The exhaust gas system 2 further includes a pre-catalytic converter lambda probe which is arranged upstream of the exhaust gas catalytic converter 3 and operates as a master probe, and a post-catalytic converter lambda probe 6 which is associated with the exhaust gas catalytic converter 3 and operates as a control probe.

In the present exemplary embodiment, the post-catalytic converter lambda probe 6 is arranged downstream of the exhaust gas catalytic converter 3. However, this post-catalytic converter lambda probe could also be arranged directly inside the exhaust gas catalytic converter 3, i.e., after a partial volume or partial section of the oxygen, store 4.

The object is here to measure the oxygen storage capacity of the oxygen store 4. Because the air-fuel ratio lambda must be adjusted in the context of this measurement, it will here be assumed that the exhaust gas of the internal combustion engine 1 can be adjusted to a predetermined air-fuel ratio lambda at least with a predetermined accuracy based on the signal from the pre-catalytic converter lambda probe 5. A problem may be encountered if the pre-catalytic converter lambda probe 5 outputs a faulty output signal. In the present example, the problem caused by an offset in the output signal of the pre-catalytic converter lambda probe 5 is addressed. This offset is taken into account by measuring the oxygen storage capacity in a manner described below.

First, it the consequence of an offset in the output signal of the pre-catalytic converter lambda probe will be illustrated with reference to FIG. 2.

Figure 2:
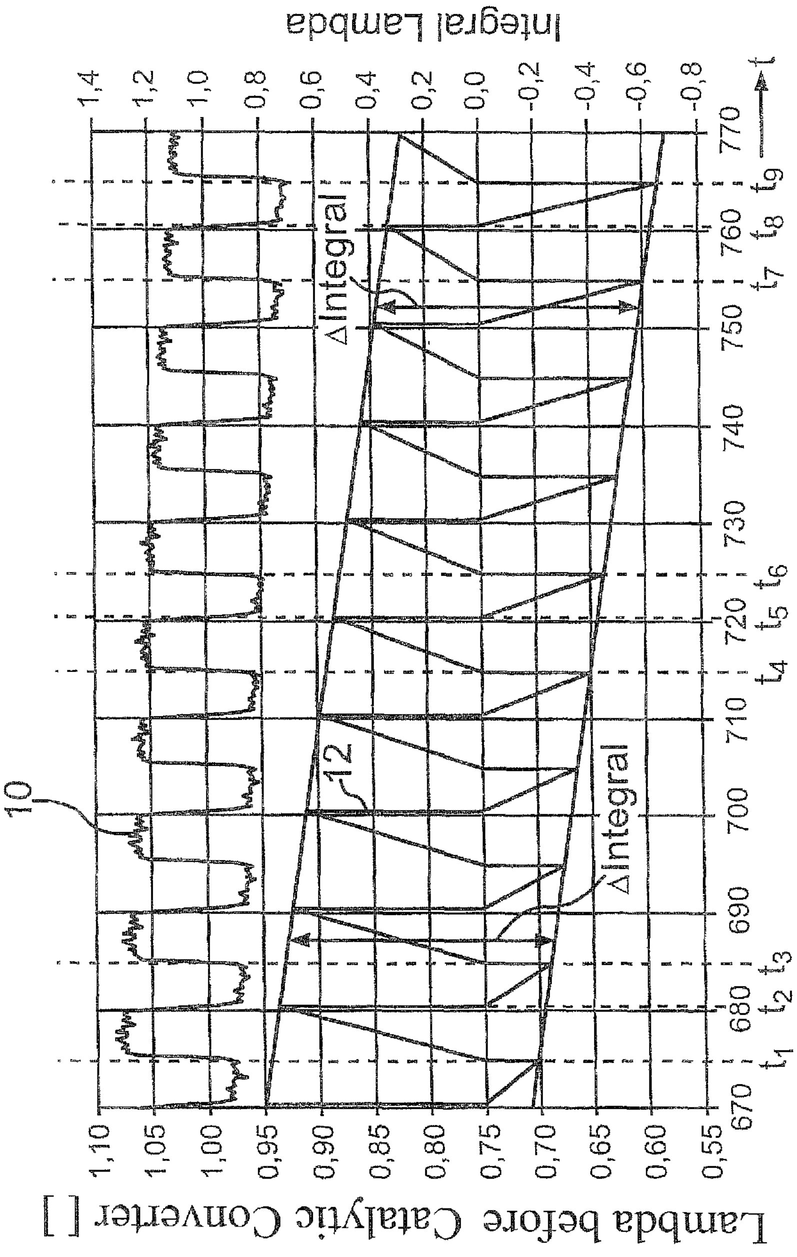
FIG. 2 shows a schematic diagram of the relationship between a value for the air-fuel ratio and a computed integral for the oxygen storage capacity, depicting several situations occurring sequentially in time.

FIG. 2 shows the signal from the pre-catalytic converter lambda probe 5 as curve 10; different exemplary situations are depicted where the oxygen storage capacity can be measured; and an associated integral, which describes the oxygen intake storage capacity and the oxygen removal storage capacity, respectively, of the oxygen store 4 based on sections of the curve 10, is shown as curve 12. The integral is computed as follows:

$$OSC/RSC = 0,23\int_{t_a}^{t_b}(\lambda(t)-1)\dot{m}(t)dt, \tag{1}$$

wherein $\lambda(t)$ is the air-fuel ratio in the exhaust gas and $\dot{m}(t)$ is the exhaust gas masks flow. OSC is the oxygen storage capacity.

The same formula is also used for $(\lambda(t)-1)<0$ for calculating the oxygen removal storage capacity RSC.

In a symbolic time integral from $t_4$ to $t_6$, the oxygen store 4 is first exposed (in the interval from $t_4$ to $t_5$) to lean exhaust gas with a lambda value of 1.05, and subsequently (in the interval from $t_5$ to $t_6$) with rich exhaust gas with a lambda value of 0.95. The absolute value of $(\lambda(t)-1$ is therefore identical in the intervals from $t_4$ to $t_5$ and from $t_5$ to $t_6$. It is therefore not surprising that the value of the integral during oxygen intake is exactly the same as during oxygen removal.

Referring now to the interval $t_1$ to $t_3$. The curve has an upward offset of about 0.25 with respect to the interval from $t_4$ to $t_6$. This means that an exposure with an air-fuel ratio lambda of 1.075 occurs in the interval from $t_1$ to $t_2$, and an exposure with an air-fuel ratio lambda of 0.975 occurs in the interval from $t_2$ to $t_3$. The computed integral for the oxygen intake storage capacity between $t_1$ and $t_2$ is therefore significantly greater than the integral for the oxygen removal storage capacity $t_2$ to $t_3$.

The integral from $t_1$ to $t_2$ is therefore greater by the same amount compared to the integral between $t_4$ and $t_5$ as the integral between $t_2$ and $t_3$ is smaller than the integral between $t_5$ and $t_6$. In other words, the spacing between the peaks in the curve, indicated in FIG. 2 as ΔIntegral, is identical.

In the interval between $t_7$ to $t_9$, an offset in the negative direction is assumed, an exposure occurs here with lean exhaust gas with an air-fuel ratio of 1.025, and with rich exhaust gas with an air-fuel ratio of 0.925. The integral computed for the oxygen intake storage capacity is correspondingly smaller (between $t_7$ and $t_8$), the integral for the oxygen removal storage capacity, between $t_8$ and $t_9$, is correspondingly greater.

However, the distance between the peaks, ΔIntegral, is once more identical.

Stated differently, the following applies: The same value ΔIntegral is always obtained when subtracting the oxygen removal storage capacity from the oxygen intake storage capacity. This corresponds to an addition of the absolute values of the integral. As can be seen from FIG. 2, the value ΔIntegral is independent of the offset. The quantity ΔIntegral is calculated based on FIG. 2 exclusively from the presumably actually measured lambda values.

In the present situation, a value for lambda is actually measured which differs by an offset from the true value for lambda. The realization that the effects of the offset on a computation of the oxygen intake storage capacity, on one hand, and on a computation of the oxygen removal storage capacity, on the other hand, exactly compensate each other, will now be used to propose a method for reliably measuring the oxygen storage capacity.

Figure 3:
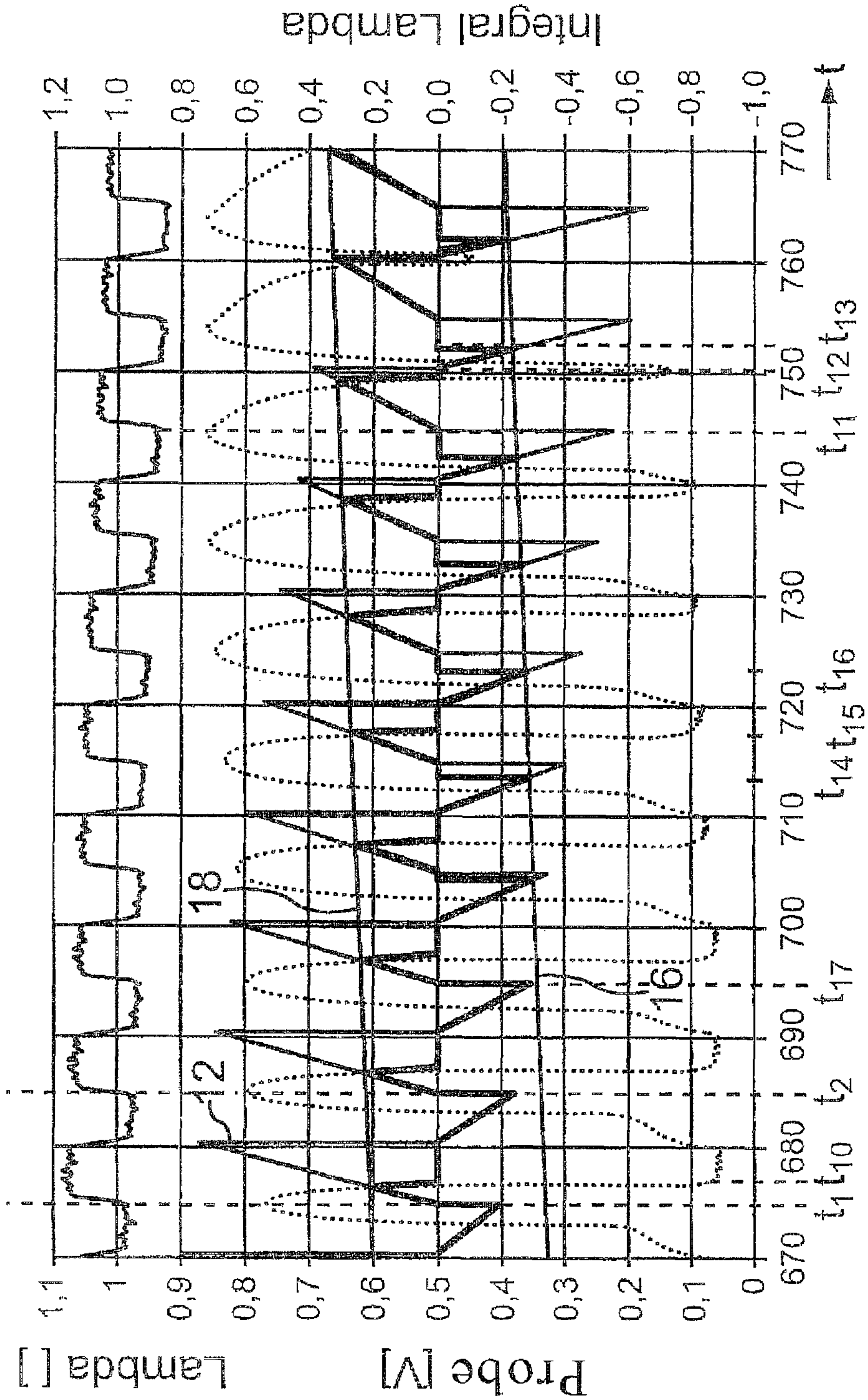
FIG. 3 shows a diagram corresponding to FIG. 2, showing also the signal of a post-catalytic converter lambda probe and the curves of the integrals computed with the method according to the invention.

FIG. 3 shows once more the curve 10 as well as the curve 12. Regarding the curve 10 in FIG. 3, it will be assumed that this is the lambda value obtained when the pre-catalytic converter lambda probe 5 shows an offset, and when the output values of the lambda probe 5 are controlled so as lie alternatingly between 1.05 and 0.95. For example, the lambda probe would have a downward offset of 0.25 between the symbolically indicated times $t_1$ and $t_2$. It thus measures a value for the actual air-fuel ratio which is too low by 0.5, with the consequence that a corresponding upward offset by 0.25 occurs when a certain air-fuel ratio is controlled based on the output signal of the pre-catalytic converter lambda probe 5.

FIG. 3 shows the output signal of the post-catalytic converter lambda probe 6. With conventional methods for computing the oxygen storage capacity, a changeover from an exposure to lean exhaust gas and filling of the oxygen store to exposure with rich exhaust gas occurs, when a jump in the output signal of the post-catalytic converter lambda probe is detected. For example, the value of 0.45 V in the output signal of the post-catalytic converter lambda probe, which occurs at a time $t_{10}$, is used as a threshold value for the jump. In the present example, however, no changeover to rich exhaust gas occurs at the time $t_{10}$, and the operation instead continuous lean, until the value of the output voltage of the post-catalytic converter lambda probe has reached a minimum, namely at the time $t_2$. This ensures that not only the surface store of the oxygen store 4 is filled, but also the deep store.

This has the following effect: in the present situation, an integral is in each case not computed to the end of the exposure to lean exhaust gas or to the end of the exposure to rich exhaust gas, but the end of the integral is instead defined when the threshold value crosses 0.45 V (during decrease) or 0.85 V (during increase). The computation of the integral always starts with a changeover. The dash-dotted curve is then obtained for the computed integral.

The following can be seen from FIG. 3:

This integral for the oxygen intake storage capacity changes by the same value (with the opposite mathematical sign) as the corresponding integral for the oxygen removal capacity, if the offset is not too large. For example, due to an offset, the integral computed between the times $t_{11}$ and $t_{12}$ is greater by exactly the same value than the "correct value", as the integral measured between $t_{12}$ and $t_{13}$ is smaller than the "correct value". The respective "correct value" is measured, for example, between $t_{14}$ and $t_{15}$ and between $t_{15}$ and $t_{16}$, respectively.

As seen from the lines 16 and 18, this compensation effect applies to certain offsets, in the present example from the time $t_{17}$ to the time $t_{13}$. Before the time $t_{17}$ and after the time $t_{13}$ the offset is too great and can no longer be compensated.

If the changeover from lean to rich and vice versa is not triggered when the output signal of the post-catalytic converter lambda probe 6 crosses the threshold value of 0.45 V, but the corresponding exposure is instead continued for some time until the deep store is also filled or emptied, then a value for the oxygen storage capacity, which up to a certain magnitude of the offset in the output signal of the pre-catalytic converter lambda probe 5 is independent of the offset, can be obtained by computing the value ΔIntegral 2, i.e., the sum of the two individual integrals, during exposure with "lean", on one hand, and exposure with "rich", on the other hand.

As mentioned above, the time axis in FIGS. 2 and 3 has only symbolic significance and is used only to describe individual time segments for which the existing situation is different.

Figures 4A, 4B:
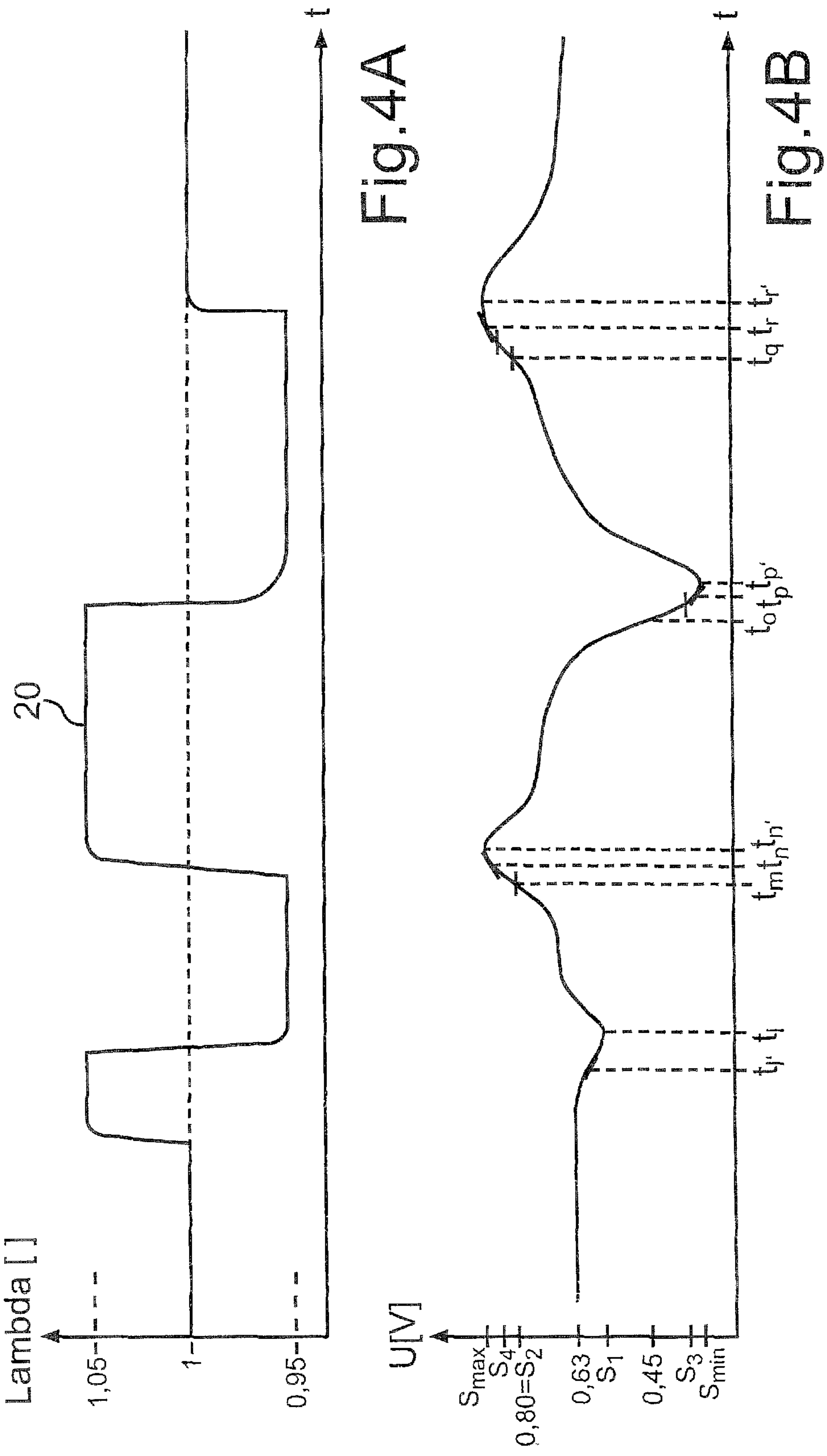
FIG. 4A shows the air-fuel ratio lambda, as adjusted based on a signal of a pre-catalytic converter lambda probe according to FIG. 4B.
FIG. 4B shows the time dependence of an output voltage of a post-catalytic converter lambda probe.

If a certain unknown situation is encountered, i.e., if the offset of the pre-catalytic converter lambda probe 5 is unknown, then the following approach is taken, as will now be described with reference to FIGS. 4A and 4B:

Following an exposure phase of the oxygen store 4 with an air-fuel ratio equal to one, as measured with a potentially faulty lambda probe, wherein the output signal of the post-catalytic converter lambda probe is 0.63 V, the exposure is changed over to lean exhaust gas, thereby slightly filling the oxygen store 4. This is by the output voltage U of the post-catalytic converter lambda probe 6 reaching a threshold value $S_1$ at the time $t_l$. When this threshold value is reached, a changeover in the exposure to rich exhaust gas is triggered, with an air-fuel ratio of 0.95, as measured with the potentially faulty pre-catalytic converter lambda probe.

Likewise, a changeover in the exposure to rich exhaust gas at the time t may be triggered when the output signal from the post-catalytic converter lambda probe 6 reaches a predetermined time derivative.

Exposure to rich exhaust gas is used to completely empty the oxygen store. After the output signal from the post-catalytic converter lambda probe has increased shortly after the time $t_l$, the output signal remains constant for a certain time at a value of about 0.63 V. The output voltage U of the post-catalytic converter lambda probe exceeds a threshold value $S_2$ only when the oxygen store is almost completely empty. This occurs at the time $t_m$. After this threshold $S_2$ has been exceeded, it is checked if the time derivative has reached a certain threshold value, for example at the time $t_n$. In the same way, it could be checked if a maximum $S_{max}$ has been reached, which is the case at the time $t_{n'}$. The oxygen store is then considered to be sufficiently empty at the time $t_n$, beginning the actual measurement of the oxygen intake storage. Oxygen is then intentionally introduced into the oxygen store 4, commensurate with a changeover to lean exhaust gas.

The integral OSC is now computed according to the above formula (1) with $t_a=t_{n'}$, wherein the computation of the integral ends at the time $t_o$ when a threshold value of 0.45 V is crossed. However, the exposure to lean exhaust gas does not end at that time. Instead, it is checked if a threshold value $S_3$ is crossed, and after this threshold value has been crossed, it is checked if the derivative has a predetermined value, which may happen, for example, at the time $t_p$, or if a minimum $S_{min}$ has been reached, which may happen at the time $t_{p'}$. A changeover to rich exhaust gas then occurs at the time $t_p$. By starting the changeover to "rich" not at the time $t_o$, but rather at the time $t_p$, the oxygen store, including the deep store, is definitely completely filled independent of the offset in the pre-catalytic converter lambda probe 5. Thereafter, the oxygen store can be emptied through exposure to rich exhaust gas. The integral RSC is now once more computed according to the above formula (1) for OSC, wherein $t_a$ is now equal to $t_{p'}$, and the computation of the integral is terminated when the threshold value $S_2$ of 0.80 V is exceeded at the time $t_q$, with $t_b = t_q$ in the above formula.

To effect a reset after termination of the measurement, it is once more checked if the threshold $S_2$ has been reached or exceeded, and thereafter if a time derivative has been reached at the time $t_r$ or $t_{r'}$, respectively. The air-fuel ratio, to which the oxygen store is exposed, then returns to a value for lambda of one, still measured with the pre-catalytic converter lambda probe 5 with an output signal potentially having an offset.

As described above with reference to FIG. 3, with two values for OSC/RSC can now be subtracted from each other, or their absolute values can be added, i.e., OSC measured from $t_{o''}$ to $t_o$, on one hand, and RSC measured from $t_{p'}$ to $t_q$, on the other hand. The effect of an offset in the output signal of the pre-catalytic converter lambda probe 5, which in the measurement of the values according to the curve 20 causes the values to deviate from the curve 20 by the offset, is compensated by combining the two determined integral for OSC and RSC. This compensation is possible because one waits beyond a time $t_o$ until the post-catalytic converter lambda probe indicates that the oxygen store is in fact full at the time $t_p$.

The situation described above with reference to FIGS. 4A and 4B can also be reversed: in particular, the oxygen removable storage capacity can be initially computed, corresponding to an initial exposure with rich exhaust gas, whereafter the oxygen intake storage capacity is computed through subsequent exposure with lean exhaust gas. Because both the oxygen intake storage capacity and the oxygen removable storage capacity are computed, the sequential order of their measurement is unimportant, as long as it can always be assumed that the deep store is completely empty or completely full.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for determining oxygen storage capacity of an oxygen store associated with a catalytic converter in an exhaust gas system of an internal combustion engine, the exhaust gas system having a pre-catalytic converter lambda probe arranged upstream of at least one section of the catalytic converter and a post-catalytic converter lambda probe arranged downstream of the at least one section in the flow direction of exhaust gas, the method comprising the steps of:

a) removing oxygen from the oxygen store to produce a substantially empty oxygen store or introducing oxygen in the oxygen store to produce a substantially full oxygen store, and b) exposing the substantially empty oxygen store to lean exhaust gas or exposing the substantially full oxygen store to rich exhaust gas, until an output signal of the post-catalytic converter lambda probe satisfies a first predetermined criterion which is selected so that the oxygen store is completely full or completely empty in relation to a predetermined level, even if an output signal of the pre-catalytic converter lambda probe has an offset, and determining a first time integral over the introduced or removed quantity of oxygen per unit time from the time of the exposing until a first threshold value is crossed, c) further exposing the oxygen store that was previously exposed in step b) to lean exhaust gas to rich exhaust gas or exposing the oxygen store that was previously exposed in step b) to rich exhaust gas to lean exhaust gas, and determining a second time integral over the removed or introduced quantity of oxygen per unit time starting from the time of the further exposing until a second threshold value is crossed, and d) adding absolute values of the first time integral and the second time integral to obtain a measure for the oxygen storage capacity.

2. The method of claim 1, wherein the further exposure in step c) occurs until the output signal of the post-catalytic converter lambda probe satisfies a second predetermined criterion which is selected such that the oxygen store is completely empty or completely full in relation to the predetermined level, even if the output signal of the pre-catalytic converter lambda probe has an offset.

3. The method of claim 1, wherein at least one of the first and the second predetermined criterion causes the output signal of the post-catalytic converter lambda probe to cross a third or a fourth threshold value and a value of the output signal or a time derivative of the output signal to reach a limit value.

* * * * *